Feb. 24, 1959
G. G. ENSIGN ET AL
2,875,262
ELECTRICAL ENERGY PRODUCING CELL CONSTRUCTION
Filed June 23, 1954
3 Sheets-Sheet 1
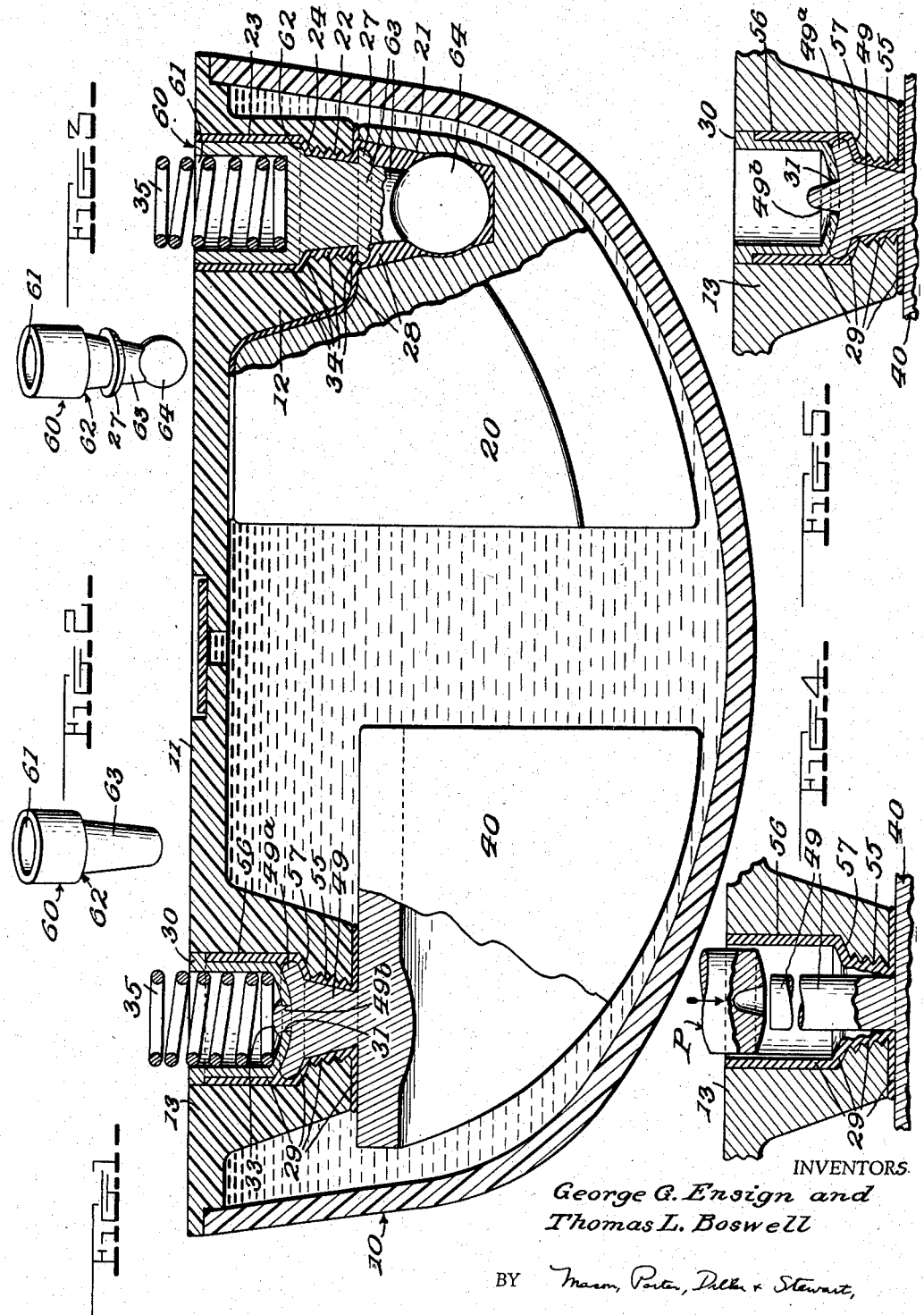
INVENTORS.
George G. Ensign and
Thomas L. Boswell
BY Mason, Porter, Diller & Stewart,
ATTORNEYS Feb. 24, 1959 G. G. ENSIGN ET AL 2,875,262
ELECTRICAL ENERGY PRODUCING CELL CONSTRUCTION
Filed June 23, 1954 3 Sheets-Sheet 2
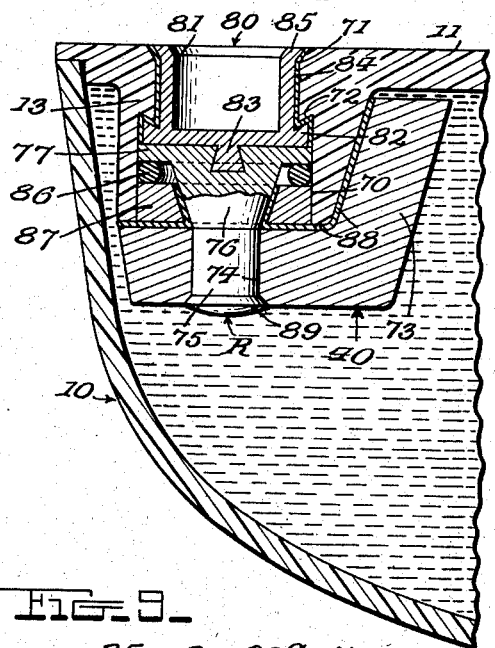
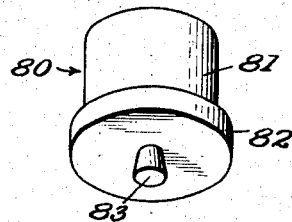
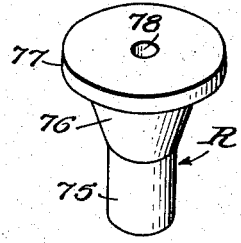
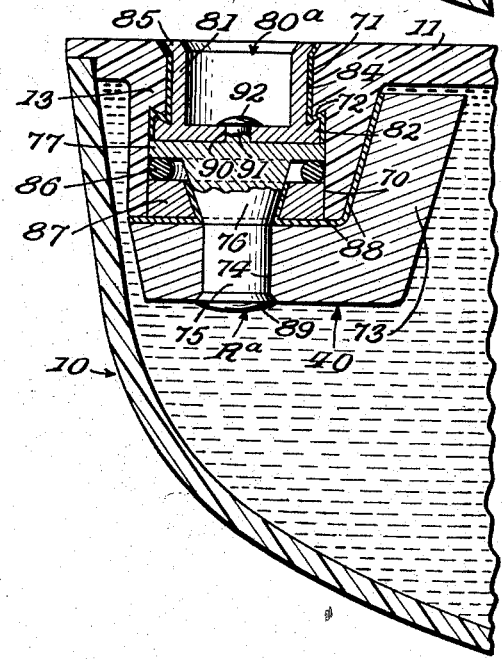
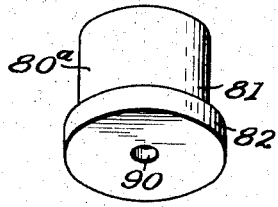
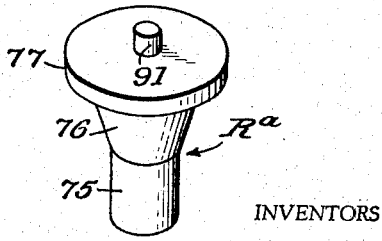
INVENTORS
George G. Ensign and
Thomas L. Boswell
BY Mason, Porter, Diller + Stewart,
ATTORNEYS

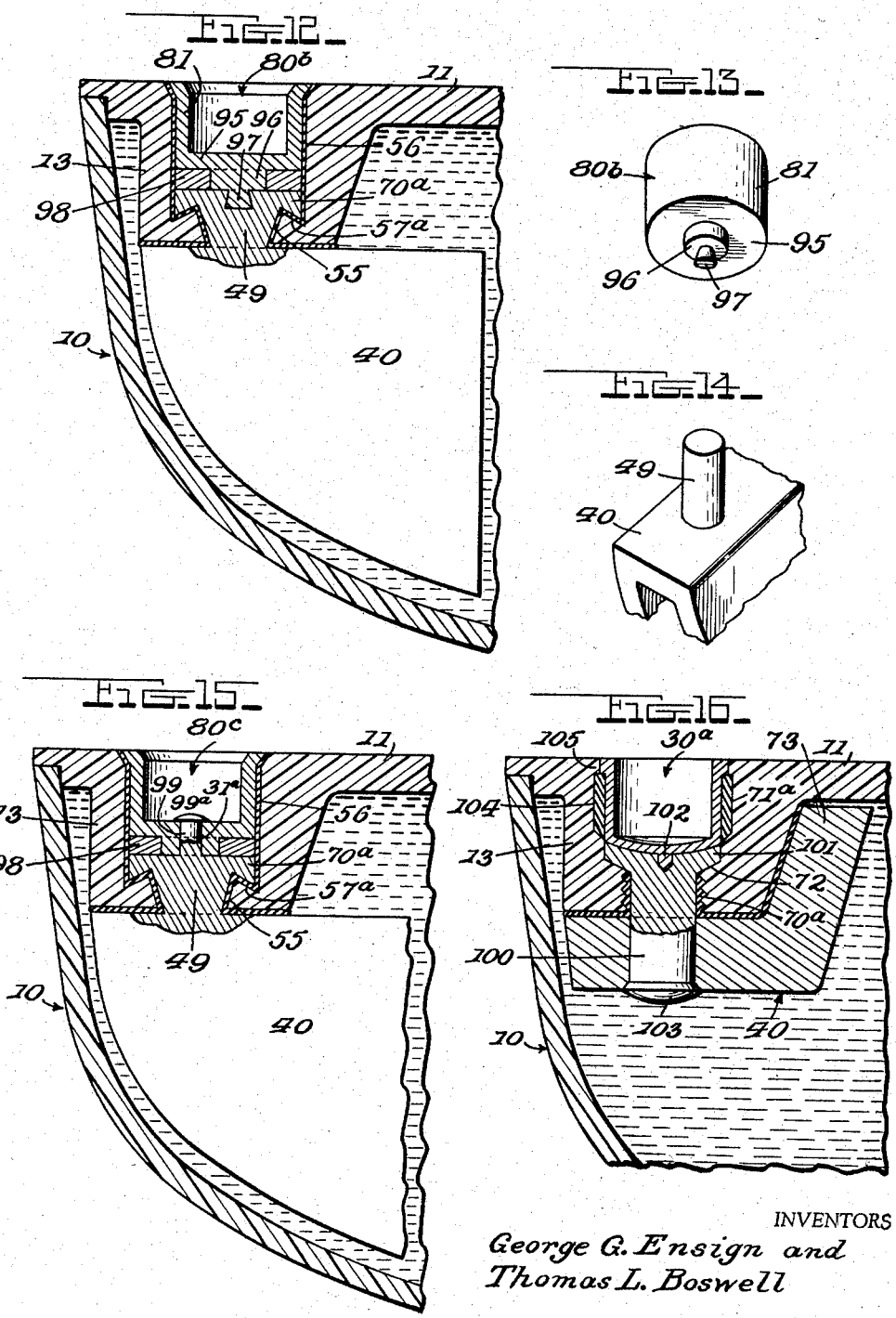

United States Patent Office 2,875,262
Patented Feb. 24, 1959

2,875,262

ELECTRICAL ENERGY PRODUCING CELL CONSTRUCTION

George G. Ensign and Thomas L. Boswell, Elgin, Ill., assignors to Elgin National Watch Company, Elgin, Ill., a corporation of Illinois Application June 23, 1954, Serial No. 438,750

10 Claims. (Cl. 136—133)

This invention relates to electrical voltaic or electrical energy producing cell constructions which are of particular value for cells of small size.

In the copending application Serial No. 297,012, filed July 3, 1952, of George G. Ensign and Thomas L. Boswell, now United States Patent No. 2,781,414, we have shown and described a construction of such cells, particularly adapted for use in the electrical actuation of a watch: and illustratively the present invention is set out in conjunction with employment of a similar battery case, anode, cathode, and electrolyte arrangement.

A feature of the invention is the provision of a sealed cell structure including metal terminal elements sealed against seepage of electrolyte and escape of electrolyte under pressure, the cell providing shaped surfaces for detaining this sealing material.

Another feature is the provision of a cell comprising a receptacle, a cover, electrodes mounted on the cover and including terminals having their external parts resistant to ambient conditions, and including sealing compositions effective to hold the parts together and essentially rigid with respect to one another, with co-active shaping of electrode and terminal material to assure electrical connection therebetween.

A further feature is the provision of a sealed cell structure in which an anode of extrudable material is seated and sealed in an aperture of the receptacle and is formed during cell manufacture through pressure thereon so that it provides a strong mechanical and electrical connection with an external terminal part.

Another feature of the invention is the provision of a sealed cell structure including an external housing and a cathode contained therein, together with a terminal pin mechanically and electrically joined to the cathode and having exteriorly a cavity for receiving a contact spring.

A further feature of the invention is the provision of a housing of electrolyte-resistant, non-conductive material, and electrode structures including conductive parts leading toward the exterior in openings of the housing, in which the walls of the housing openings are formed to assure a tight mechanical seating while assuring maintenance of a sealing material in position around the said parts.

Another feature is the provision of structures in which pressure caused by anode corrosion products acts to tighten the seal at the anode terminal.

With these and other features as objects in view, as will appear from the following description and claims, an illustrative form of practice of the invention is shown in the accompanying drawings, in which:

Fig. 1 shows a cell construction with the outer case or housing parts in section, and with the electrode and connection parts partly in section and partly in elevation.

Fig. 2 is a perspective view of a cathode terminal pin as initially made.

Fig. 3 is a view corresponding to Fig. 2, and showing the pin provided with a cathode-engaging inner end, the cell structure being omitted for clearness.

Fig. 4 is a view corresponding to a fragment at the anode connection in Fig. 1, and indicating the initial step of introducing the anode.

Fig. 5 is a view corresponding to Fig. 4, and showing the penetration of anode material within the external terminal member.

Fig. 6 corresponds to a part of Fig. 1, and illustrates another form of practice.

Figs. 7 and 8 are perspective views of elements used in Fig. 6.

Fig. 9 corresponds to Fig. 6, and illustrates a third form of practice.

Figs. 10 and 11 are perspective views of elements used in Fig. 9.

Fig. 12 corresponds to Fig. 6, and illustrates a fourth form of practice.

Figs. 13 and 14 are perspective views of elements used in Fig. 12.

Fig. 15 corresponds to Fig. 6, and illustrates a fifth form of practice.

Fig. 16 corresponds to Fig. 6, and illustrates a further form of practice.

The problems of making a satisfactory and completely sealed electrical energy producing cell, satisfactory for employment as a source of electrical energy to actuate a watch, has been set out in the copending application Serial No. 297,012, now Patent No. 2,781,414. Such a cell may have the outer housing made with a receptacle 10 of a material which is non-reactive to the electrolyte, such as a molded non-conductive plastic, with closely spaced essentially parallel side walls having arcuate edges and a peripheral connecting wall. A cover 11 of such material is illustratively shown as sealed at the lip of the case 10 and serves as a support for the electrodes with their terminal structures. Its central portion has a thin center while bosses 12, 13 are provided adjacent the ends. The cell and cover parts are joined at their meeting edges, in sealed assembly, by applying a bonding agent which may be a solvent for the case material, possibly with some of such material in solution for controlling the viscosity, or it may be a cementitious electrolyte-resistant material.

The cathode 20 may be made of a mixture including conductive silver powder and a depolarizing substance such as mercuric oxide in fine particle form bonded and held by the sponge-like septum walls of an inert plastic. An illustrative electrode composition and mass comprises 89.5 percent by weight of mercuric oxide, 4.0 percent of graphite, 5.0 percent of silver in powder form, and 1.5 percent of polyvinyl formal (5 to 10 percent residual hydroxyls). Other useful compositions are described and claimed in the copending application Serial No. 297,011 of George G. Ensign, filed July 3, 1952, now U. S. Patent No. 2,772,321. As shown in Fig. 1, the shape conforms generally to the inner surfaces of the receptacle walls, with an electrolyte spacing of about 0.005 inch for a small battery intended for use in an electrically actuated wrist watch. The cathode mass is molded with a cavity 21 having a slightly tapered form.

The terminal construction at the cathode provides for adequate electrical conduction and mechanical supporting strength for the mass, which usually becomes weaker as a result of cell activity. The boss 12 has an opening therethrough with a smaller part 22 at the inner end, tapered with the apex downward in the drawing, and a larger part 23 at the outer end, with a shoulder 24 between them. In order to provide support, for preventing displacement of the sealing material during and after assembly, the smaller part 22 of the opening is preferably formed with grooves, for example by employment of a threading tap which leaves three or more thread grooves along the length of the smaller part 22.

A conductive cathode cup and pin 60, which is cathodic to the depolarizing material, e. g. of silver for the above cathode mixture, and also is resistant to the atmosphere, a condition which is satisfied by making the pin of silver, is made in the form shown in Fig. 2 with a cylindrical cavity 61 at its larger end, a shoulder 62 at the lower part of the larger end, and a tapered stem or shank 63 which is somewhat smaller than the pre-formed cavity 21 in the cathode. By preference, the sizes of the shank 63 and of the cavity 21 are different, the cathode recess being greater, as shown: with the tapers of the shank and the opening 22 mating to secure a tight mechanical seating. The clearance between the cup portion and the hole in the cover can be about 0.004 inch which permits a thin and adequate film of about 0.002 inch of the sealing cement to be present during the assembly without being scraped away during the mechanical operations. Illustratively, for a watch battery, the cup portion may have an external diameter of 0.07 inch.

In assembly, a coating of liquid sealing cement solution is applied to the wall of the passage 22, 23, 24 in the boss 12; and the solvent is evaporated by drying at 120 degrees F. for an hour. The exterior of the cathode cup pin (Fig. 2) is coated with thick sealing composition; and this cup pin 60, 62, 63 is passed into the cover passage until its shoulder 62 seats firmly, with intervening sealing material 34, against the shoulder 24 and the stem likewise engages in the tapered bore. The structure is supported, and an upsetting or staking operation performed to provide the enlargement 27 for mechanically holding the parts in position: some of the sealing cement is usually squeezed out, and this is wiped off to insure a firm, mechanically strong bond directly between the boss 12 and the cathode by means of the conductive cement applied later. It is preferred next to assemble the anode to the cover completely before proceeding to attach the cathode mass to the cover. Conductive sealing cement is placed over the top of the cathode 20, and into the cavity 21. The cathode 20 is pressed into place over the pin shank 63, 64 to get a solid mechanical and electrical fit between the flat 64 and the cavity wall; and held until initial setting occurs which, with preferred compositions, occurs in a few seconds. It can then be completely set, by heating for an hour at 120 degrees F. The final terminal and cathode assembly has conductive sealing cement 28 filling the cathode cavity around the pin 63, 64, and forming a yielding connective and sealing film between the top of the cathode and the contiguous surfaces of the boss 12. The sealing material 34 occupies the space between the cathode cup 60 and the wall of bore 23, and between the shoulders 24, 62 and in the tapered threaded bore 22 around the pin 63, and between the enlargement 27 and the lower surface of the boss 12.

The construction for the anode 40 is employed with the anode formed of a ductile metal (e. g. zinc, tin, indium), and the forming of this anode and its projecting pin 49 may be accomplished as set out in the aforesaid Patent No. 2,781,414, the anode structure being formed originally as shown in Fig. 4.

The boss 13 has an opening therethrough with a larger diameter 56 at the outer end, and a smaller diameter 55 at the inner end, joined by a tapered shoulder 57. The smaller part 55 is preferably tapered, with the apex toward the interior, and likewise has a peripherally chased internal surface which may be provided by employing a threading tap preferably with a tapered entering end to form grooves therein. A cup 30 of conductive and atmosphere-resisting material, such as silver, is formed with its external periphery slightly smaller than the diameter of the part 56 of the opening. The cup 30 preferably has an aperture 31 in its bottom which is larger than the projection 49$^b$ to be formed on the anode pin 49 as described below.

The assembly of the anode and cover begins with applying diluted and fluid sealing composition to the interior of the passage in the boss; and drying for about an hour at 120 degrees F. to expel the solvent and produce a tacky adherent film in resiliently yielding state. This may be done concurrently with the forming of such film at the cathode. A less dilute sealing composition, having the consistency of a cold cream is placed over the inner end surface of the boss 13, and the anode extension 49 is pushed into the lower bore 55 until the anode seats against this thick sealing layer. The anode is supported, and the punch P (Fig. 4) is employed to press the end of the extension 49, thereby shaping the ductile material to conformity with the tapered threaded opening, and to provide a top flange 49$^a$. Therewith, the flowing metal makes contact with the sealing cement and establishes a tight seal. The punch P is shown to have a lower hollow, so that a projection 49$^b$ is formed above the flange 49$^a$. The exterior of the anode cup 30 is coated with a thick sealing composition and is then inserted, Fig. 5, until the projection 49$^b$ passes through the hole 31 in the cup 30; and the parts are firmly pressed, and finally the end of projection 49$^b$ is riveted over to form the head 33, Fig. 1, inside the cup 30; thus forming a secure mechanical and electrical connection and sealing the hole 31. The parts are cathodically electrolyzed, which can be done concurrently with the treatment at the cathode terminal; then electrolyzed anodically, rinsed and dried. Finally, it is heated at 120 degrees F. for an hour, usually concurrently with the final cathode heating, to expel solvent. The completed assembly has yielding sealing material 29 filling the space in the bore 56, around the cup 30 and the flange 49$^a$, between this flange 49$^a$ and the shoulder 57, within the tapered threaded bore 55 and the anode extension, particularly in the chase in the bore 55, and between the top of the anode 40 and the contiguous surface of the boss 13.

The assembly can be made if desired, it will be noted, by employing a single formulation of electrolyte-impervious conductive lacquer for the sealing films 34, 28 and 29. Such films are at present produced by evaporating the solvent from a solution of a synthetic resin or elastomer which is resistant to the electrolyte and which may be described as hydrophobic in that it rejects capillary progress of the electrolyte along narrow passages bounded in part by the cement. The preferred cement for the sealing film 34 is stiffly plastic after evaporation of the solvent, to permit movement and conformation during assembly and service of the cell, it being noted that the structure assures that the film will remain in place and in particular that the aforesaid grooves assure against expulsion of all cement from between wall and electrode extension. Suitable bonding cements or sealing compositions can be made from (a) polybutene (in liquid form with molecular weight about 660) one part by weight, polyisobutylene (a solid with molecular weight 64000 to 81000) one part, polyethylene (consistency of cup grease with molecular weight about 500 to 1000) four parts, and trichlorethylene (a solvent) five parts; (b) polyvinyl formal (residual hydroxyl content 15 to 20 percent) six parts, ethylene dichloride (a solvent) ten parts, and divinyl benzene (a commercial mixture containing ethyl benzenes which strengthen without embrittling the bonding material) three parts; (c) the above polybutene two parts, butyl rubber three parts, and five parts of a solvent mixture of ethylenedichloride and xylene (equal parts of each); (d) polymerized chlorofluorinated hydrocarbon (a solid resinous mass) one part, and dichlorobenzotrifluoride nine parts. Each is a viscous solution. When tested for contact or meniscus angle between air, an alkaline electrolyte, and a specimen film of sealing material, cured on glass, the respective values were 28 degrees for (a) and (b), 38 degrees for (c), and 31 degrees for (d).

Polyvinyl formal is an article of commerce, and can be made by catalytic reaction of acetylene and acetic acid to form vinyl acetate which is then polymerized and then hydrolized so that the acetyl groups are replaced in large part by hydroxyls to form polyvinyl alcohol: this alcohol is then catalytically reacted with formaldehyde while heating to form an internal di-ether between the aldehyde and alcohol groups. By stopping the reaction, various contents of hydroxyl groups may be retained: commercially available forms have, for example, 5–10 or 15–20 percent of the original hydroxyls retained, the first form being more rigid and strong and the second having a greater bonding effect between plastic and metal. For cathode compositions, the lower content of hydroxyls is preferred. For bonding cements, the higher content is preferred. Such cements are characterized in being resistant to alkaline electrolytes and repellent thereof so that the contact angle is above 25 degrees: the above compositions can have contact angles up to 40 degrees. The solution and the deposited residue are both adherent to the cell walls and to silver, indium, tin and zinc, either as such or in amalgamated form; the residue being very stiffly fluid under pressure so that it effects a seal while permitting the mechanical parts to be pressed to shape; and suffers no further volume change after expulsion of the solvent. When a more liquid state is desired, e. g. for coating the passage openings in the bosses, more solvent is added: noting that the initial escape of solvent is rapid even at room temperature, so that initial setting will occur in a few seconds.

During this operation, the sealing composition is distributed over the wall surfaces as a film 34, and a solid and firmly supported structure results, it being noted that the aperture 31 is effective during the descent of the cup 30 to permit the escape of trapped air or other gas. Finally, the extruded projection 49$^b$ (Fig. 5) of the anode material is upset to form a rigid head 33 (Fig. 1) as a further assurance of excellent mechanical and electrical connection of the parts.

The cover 11, with the electrode parts and terminal members mechanically held thereto, is now positioned and sealed to the body 10 of the case. The case may be filled with electrolyte as described in the aforesaid Ensign and Boswell application.

Finally, conductor springs 35, preferably made of non-corrodible materials such as stainless steels, beryllium-copper or cobalt-nickel-chromium alloys, are introduced into the cup 30 and cavity 61.

A modified anode construction is shown in Figs. 6, 7 and 8, in which the boss 13 has a passage with a larger inner bore 70 and a smaller outer bore 71, with a shoulder 72 between them formed with a peripheral groove. The anode 40, e. g. of indium, has a top portion 73 closely fitting the adjacent surface of the boss 13. A hole 74 is provided in the anode for receiving a lead-out rivet R (Fig. 7) which is of the same material as the anode or of a material galvanically compatible with the anode material, that is, the rivet R is of a conductive substance which will not form an active galvanic couple with the anode. This rivet forms an extension of the anode. It is preferred to make the same of a material stronger than that which forms the anode; so that during the operation of the cell, when pressure or tension effects exist at the zone where the anode engages the boss, the yielding and conformance occurs in the anode and the rivet pin remains securely in place in the opening of the casing and thus maintains electrical continuity and mechanical support for the anode, along with a tight sealing against outward or inward movement of fluids. In general, mixtures of the anode material with strengthening materials may be employed, which do not establish local galvanic action between the anode and the extension in the presence of the electrolyte. Examples of such materials for use with indium anodes are: (1) an alloy of 5 parts by weight of bismuth with 95 parts of indium; (2) a physical compacted mixture of from 1 to 10 percent by weight of ceramic oxides inert to the electrolyte and of fine particle size, the balance being either indium or the indium rich indium-bismuth alloys. With tin anodes, the alloy of 5 parts by weight of bismuth with 95 parts of tin can be used. With a zinc anode, a steel pin may be used for the rivet, either with a tin plating or with the surface mechanically coated with a thin mercury film. The rivet R has a cylindrical shank portion 75 fitting the hole 74, a tapered portion 76 enlarging upwardly away from the portion 75, and a flange 77 closely fitting the bore 70. The silver cup 80 (Fig. 8) has a cylindrical portion 81 fitting the bore 71 with a diametrical clearance of about 0.004 inch, a bottom flange 82 similarly fitting the bore 70, and an integral circular dovetail projection 83. The rivet R may have a cylindrical cavity 78 to receive the projection 83. The parts are assembled by coating the surfaces of the bore 71 and shoulder 72 with a cement as before, and evaporating to set it to provide a film 84. This cup 80 is slipped through the bore 70, and is pressed until its flange 82 firmly engages the coated shoulder 72. The outer edge of the cup 80 is pressed or spun outwardly as at the lip 85 to secure it in place and engage it under pressure with the material of the cover 11. The outer terminal piece, here provided by the cup 80 with its inner flange 82 and the outer lip flange 85, is thus held to the cover independently of the rivet R and, as the cup material can be stiffer than the rivet material, a further safeguard is provided against ineffective sealing or mechanical looseness. The rivet R is then introduced, and the cup and rivet are pressed together until the material of the rivet, which is softer than that of the pin 83, allows the pin to penetrate and then passes behind it, thereby joining the parts mechanically and electrically. A ring 86 of resilient material is introduced into the bore 70, being preferably not smaller in diameter than the bore 71 so that it acts to hold flange 77 on the shoulder 72: this ring 86 may be made of Butyl rubber mixed with polyisobutylene or polybutene, or both, in proportions to form an elastomer body which will be deformed under the pressures of assembly without causing significant deformation of the rivet material; a more stiffly resilient material can be employed with zinc than with indium, for example from 25 to 50 percent of the liquid (polyisobutylene or polybutene, or a mixture) with the rest Butyl rubber, noting that excessive cold flow will occur with compositions containing over 50 per cent of such liquids. The tapered surface 76 of the rivet is coated with the cement, and a washer 87 of preformed plastic, preferably of the same material as the boss 13, such as polyvinyl formal, is slipped over the rivet shank 75 and into closely fitting relation with the bore 70. The bottom and inclined surfaces of the boss 13 and the lower surface of washer 87 with which the anode is to make contact, are then coated with cement to provide a film 88. The solvent is evaporated by heating the assembly in an oven at 120 degrees F. for one hour; and then the anode 40 is slipped over the shank 75. The bottom of cup 80 is supported, and the lower end of shank 75 is upset, while the anode portion 73 is being pressed upward, to form a rivet head 89.

In the form of Figs. 9 to 11, the cup 80$^a$ (Fig. 10) and the rivet R$^a$ (Fig. 11) respectively have a hole 90 and a pin 91 which interfit during assembly, and the pin 91 is then upset to provide a head 92 for mechanically and electrically binding the parts. In other respects, the assembly is as with Fig. 6.

The form of Figs. 12 to 14 has the cup 80$^b$ provided (Fig. 13) with the side wall 81 and the bottom 95 having concentric end projections 96, 97 of successfully smaller diameter, the projection 97 being a circular dovetail. The anode 40 is formed (Fig. 14) with a pin 49 like that of Fig. 4. The boss has a larger outer bore 56 and a smaller tapered inner bore 55, and the shoulder 57ᵃ here provided has a peripheral groove. In assembly, the boss surfaces are coated with cement as in the form of Figs. 1, 4 and 5; the extension 49 is passed into the boss, a pre-formed washer 98 of plastic material is placed around the projection 96 of the cup, and the anode and cup forced together, whereby the ductile metal of the anode projection is caused to spread and engage the wall of bore 55 and extend as a flange 70ᵃ over the shoulder 57ᵃ; and also receiving and flowing around the dovetail pin 97.

The form of Fig. 15 resembles that of Fig. 12, but the cup 80ᶜ and the anode extension are joined mechanically and electrically as in Fig. 5, by providing the cup 80ᶜ with a hole 31ᵃ, and causing material of the anode extension to be extruded through this hole as the cup and extension are forced together, to form a pin 99 and finally forming the head 99ᵃ thereon.

In the form of Fig. 16, the boss 13 has a threaded smaller inner bore 70ᵃ and a larger outer bore 71ᵃ, with a shoulder 72 therebetween. The rivet 100 may here also be formed of materials as described above for Figs. 6, 7 and 8. This rivet 100 has a top flange 101 conforming to shoulder 72, and extends through a hole in the anode 40. The silver cup 30ᵃ has a spur 102 on its bottom. In assembly, after coating the boss surfaces as before, the rivet 100 is introduced, and the anode pressed over it; and the rivet 100 is formed with a head 103 while the parts are held together with an anvil fixture conforming to and supporting the exposed surface of the flange 101. The cup 30ᵃ is then forced into position, its spur 102 entering the upper end of the rivet. In this form, also, the upper bore is modified in having a peripheral recess 104, terminating at a flange 105 extending inwardly at the upper end of the bore, for receiving sealing compound.

In each form of anode structure, if corrosion products form between the boss and anode, by reason of any imperfection of the sealing film 29 in a specific unit, the pressure tends to move the anode 40 away from the boss 13, therewith puling on the anode extension. In Fig. 1, this causes the conical part of the extension to press against the sealing material in the bore 55, and also to pull in a downward direction upon the cup 30. In the forms of Figs. 6 and 9, there is downward pull on the conical portions 76 or 91, and upward pressure on the washer 87, thus pressing the intervening sealing film. In the forms of Figs. 12 and 15, the downward pull on the tapered anode extension draws it to its seat against the sealing composition, and also pulls the flange 70ᵃ against the shoulder 57ᵃ. In the form of Fig. 16, the flange 101 is drawn against its seat. Thus, in each form, the formation of corrosion product at the anode-boss interface causes sealing pressure to develop at the points where leakage to the exterior might occur as the corrosion progresses.

It will be understood that the illustrated form is not restrictive, and that the invention may be practiced in many ways within the scope of the appended claims.

We claim:

1. The process of forming a lead-out terminal for an electrical energy producing cell having a casing with an opening therein, and also having an electrode with a ductile conductive element electrically connected thereto, which comprises introducing said element into the opening from the inner end and introducing a hollow conductive terminal member into the opening from the outer end, and forcing the said element and member together whereby to effect extrusion of the material of the element to fill the opening and to interlock mechanically with the hollow member.

2. The process of forming a lead-out terminal for an electrical energy producing cell having a casing with an opening therein including a larger outer part and a smaller inner part, and also having an electrode with a ductile conductive element electrically connected thereto, which comprises introducing said element into the opening from the inner end, introducing into the opening from the outer end an outwardly open cup having a hole in the end wall thereof, and forcing the said element and cup together whereby to effect extrusion of the material of the element around said cup and into said hole.

3. The process as in claim 2, in which an extruded part of the element is forced into the cup through the hole and is thereafter caused to spread laterally and form a head in contact with the inner wall of the cup.

4. An electrical energy producing cell comprising a case with electrodes and electrolyte therein, an element conductively connected to an electrode, said case having an opening in which the said element is received, said element and the opening wall being tapered with the apex toward the interior of the cell, a conductive member located in an outer part of the opening and having a dovetail projection at a surface directed toward the said element, the material of the element surrounding and interlocking with said projection, and a yielding sealing medium filling the space between the element and the opening wall for preventing contact of the electrolyte with the said conductive member.

5. An electrical energy producing cell comprising a case with electrodes and electrolyte therein, an element conductively connected to an electrode, said case having an opening with a larger outer bore portion and a tapered inner bore portion, the portions being joined by a tapered shoulder, said element extending into said opening and having a flange overlying said shoulder, and having a tapered portion conforming to the inner bore portion, the tapers of the inner bore portion and said element having their apexes directed inwardly, a conductive member located in an outer part of the opening and having a dovetail projection at a surface directed toward the said element, the material of the element surrounding and interlocking with said projection, and a yielding sealing medium filling the space between the element and the opening wall for preventing contact of the electrolyte with the said conductive member.

6. A cell as in claim 5, in which the shoulder provides a peripheral groove and the flange conforms to the larger bore portion and the groove, and in which sealing medium is also present between the said flange and the parts of the bore wall adjacent thereto.

7. An electrical energy producing cell comprising a case with an indium anode, cathode and an alkaline electrolyte therein, said case having an opening, and a supporting member engaged mechanically and electrically with the said anode and extending into and secured in said opening, said member being of an alloy of about five percent by weight of bismuth with the remainder of indium.

8. The process of forming a lead-out terminal for an electrical energy producing cell having a casing with an opening therein including a larger outer part and a smaller inner part, and also having an electrode with a cavity therein, which comprises introducing into the opening from the outer end a conductive pin which passes through the smaller part of the opening and has an extension therebeyond, forming lateral projections on said extension for mechanically holding the pin to said casing, expanding a part of said extension whereby to increase its lateral dimension until larger than said cavity, and forcing the expanded part of the extension into the electrode cavity to establish electrical conductive relation therewith.

9. An electrical energy producing cell comprising a case with electrodes and electrolyte therein, an element conductively related to an electrode, said case having an opening with a larger outer bore portion and a smaller tapered inner bore portion extending to the inner surface of the case, the portions being joined by a tapered shoulder, said element extending into said opening and being tapered to conform to the smaller inner bore portion, and having a flange overlying said tapered shoulder, and a yielding sealing medium filling the space between the element and the smaller tapered bore portion.

10. An electrical energy producing cell comprising a case with electrodes and electrolyte therein, said case having a tapered opening with its apex toward the interior, a tapered conductive element in electrical connection with one said electrode and seated in the opening, and a conductive hollow external member in tight mechanically seated engagement in the opening, said hollow member being an outwardly open cup having an opening in its bottom through which a portion of the element projects, said element having a head inside the cup and projecting laterally to engage the inner surface thereof.

References Cited in the file of this patent

UNITED STATES PATENTS

| | | | |
|---|---|---|---|
| 592,760 | Brewer | Nov. 2, | 1897 |
| 1,329,917 | Marko | Feb. 3, | 1920 |
| 1,375,654 | Flood | Apr. 19, | 1921 |
| 1,977,972 | Reetz | Oct. 23, | 1934 |
| 2,198,423 | Anthony | Apr. 23, | 1940 |
| 2,512,080 | Wilson | June 20, | 1950 |
| 2,683,184 | Boswell | July 6, | 1954 |
| 2,705,251 | Kirkman | Mar. 29, | 1955 |
| 2,772,321 | Ensign | Nov. 27, | 1956 |
| 2,781,414 | Ensign et al. | Feb. 12, | 1957 |

FOREIGN PATENTS

| | | | |
|---|---|---|---|
| 924,795 | France | Mar. 17, | 1947 |